March 3, 1953    L. F. JONES ET AL    2,630,343
SEALING DEVICE
Filed April 26, 1950
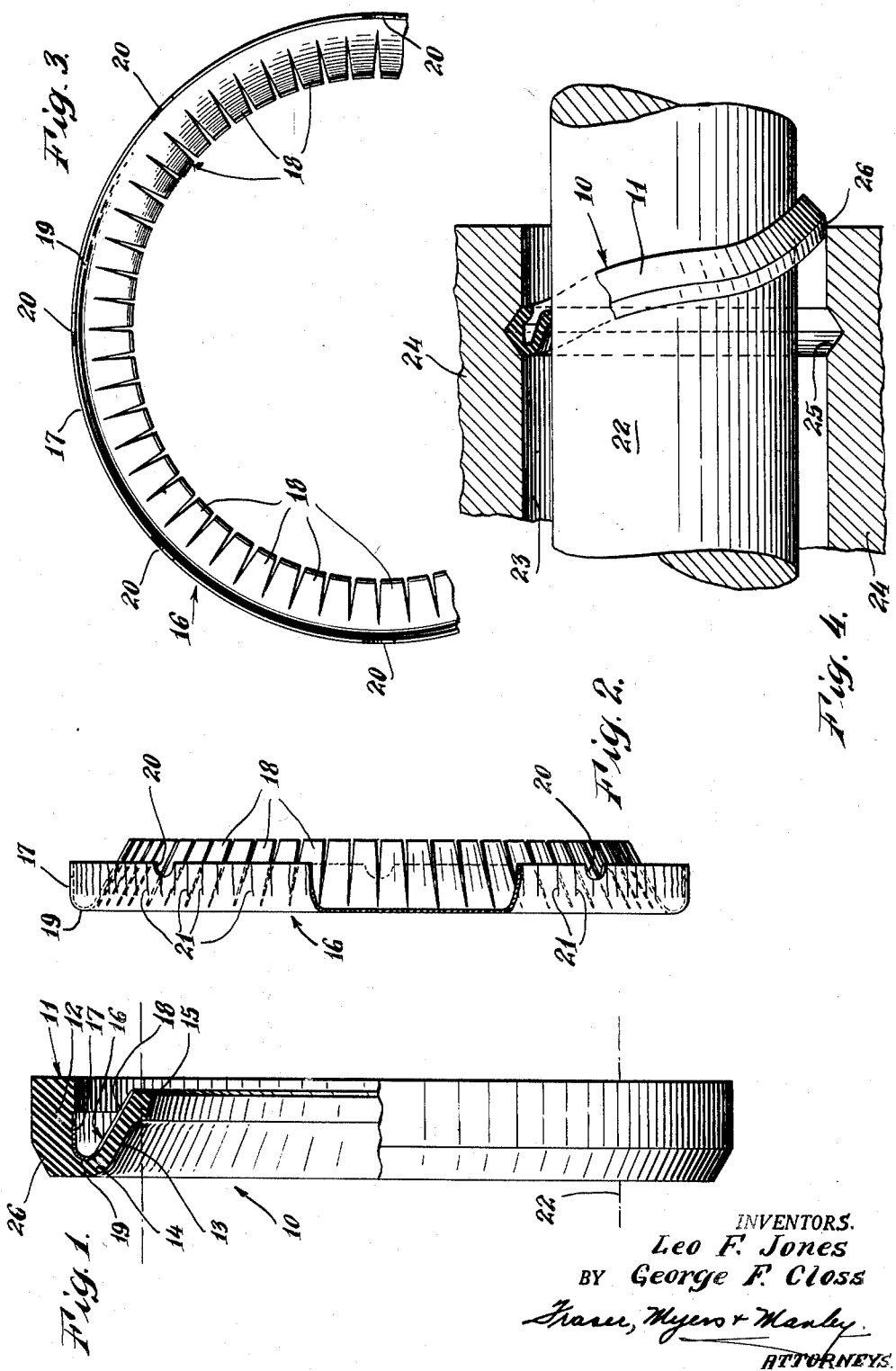
INVENTORS.
Leo F. Jones
BY George F. Closs
Fraser, Myers & Manley
ATTORNEYS Patented Mar. 3, 1953

2,630,343

UNITED STATES PATENT OFFICE 2,630,343

SEALING DEVICE

Leo F. Jones and George F. Closs, Palmyra, N. Y., assignors to The Garlock Packing Company, Palmyra, N. Y., a corporation of New York Application April 26, 1950, Serial No. 158,148

2 Claims. (Cl. 288—2)

The present invention relates to sealing devices such as are employed to effect a seal against the escape of lubricant or other fluid along a rod or shaft which extends within an opening in a machine casing. More particularly, the invention is directed toward the provision of a very inexpensive, unitary sealing device which is relatively soft, radially deformable and flexible to facilitate its installation in a machine and which possesses characteristics enabling it to be held firmly therewithin in service.

An important object of this invention is the provision of an improved unitary sealing device in which a pressure member therein exerts a radially directed compressive force upon a radially compressible mounting portion of a sealing member to aid in holding the device firmly in place in a machine; while the device as a whole, despite the presence therein of such a pressure member, is sufficiently flexible to enable it to be pushed or otherwise maneuvered readily into proper operating position in the machine.

Another important object is the provision of an improved unitary oil seal in which a spring member therein applies its force to a sealing lip of the oil seal to enhance the lip's sealing effect and exerts a radially directed force upon a mounting portion of a sealing member to aid in holding the oil seal firmly in place in a machine; while the oil seal as a whole is sufficiently flexible to enable it to be pushed or otherwise maneuvered into operating position in the machine.

Another important object is the provision of an improved unitary oil seal device, for use within a radially inwardly facing annular recess in a machine casing opening, in which a pressure member exerts a radially directed force upon a mounting portion of a flexible sealing element to cause the latter to seat firmly within said recess; the device as a whole, however, being sufficiently deformable radially to permit it to be pushed axially into said machine casing opening yet having ample facility for radial expansion to spread radially into said recess when pushed into radial alignment therewith.

Another important object is the provision of a pressure member or spring member of novel characteristics enabling it to be thus flexed without impairing its capacity to function in a sealing device as hereinbefore stated.

The foregoing and other objects and advantages of this invention may be observed from the following description and from the accompanying drawings which show only one of numerous possible embodiments of the invention for illustrative purposes.

In the drawings:

Figure 1 is a side view of an oil seal according to the present invention, showing it in radial section in the upper-half of the figure and in side elevation in the lower-half of the figure.

Fig. 2 is a side elevation of a flexible spring member such as is employed in the structure of Fig. 1, the spring member being partly broken away to more fully illustrate its structure.

Fig. 3 is an end view of the spring member shown in Fig. 2 as viewed from the right side of the latter figure, but omitting the bottom-half of said member which is identical in its details with the upper-half.

Fig. 4 is an axial view of a shaft and a surrounding machine casing portion, the latter being shown in section; and including also an oil seal, partly in section, according to the previously described figures, which seal is in a contorted condition such as it might assume during its installation in the machine in association with the shaft.

An oil seal 10, as illustrated in the drawing, includes an annular sealing member 11 which is generally V-shaped in cross-section and formed of suitable relatively soft, flexible, molded, rubber or rubber-like material. It has an outer body or mounting portion 12, preferably of fairly substantial radial thickness, and a generally frusto-conical sealing flange 13 joined by a neck portion 14 to the mounting portion 12 so that, as viewed in radial section, it may pivot or stretch radially-outwardly somewhat from its unflexed condition, as it appears in Fig. 1, to a flexed condition in which its sealing lip 15 is in sliding sealing engagement with the outer surface of a shaft 22 which is indicated in dot-and-dash lines as extending axially through the oil seal. As is well understood by those familiar with these devices, the inner diameter of the sealing flange preferably is somewhat less at its sealing lip than the diameter of the shaft so that when the device is mounted upon the shaft the mentioned outward pivoting or stretching of the sealing flange takes place.

The oil seal also includes an annular spring member or pressure ring 16 which is of a U-shaped cross-section substantially similar to the cross-sectional shape of the sealing member 11. This spring member preferably has an outer, generally cylindrical, pressure reaction flange 17 and an inner peripheral series of spring fingers 18 which, considered collectively, are frusto-conical in shape and are joined to the reaction flange at a neck portion 19. The spring member 16 preferably is bonded into its illustrated association with the sealing member during the molding of the latter.

The spring member 16 may be formed from any suitable, relatively thin, flat, spring material. One way of forming a spring element would be to cut an annular, flat blank from the selected spring material and then cut the spring fingers into the inner marginal portion of the blank and shape the latter by placing it between dies which will upset the spring fingers from their original flat attitude to the desired frusto-conical attitude and will bend the outer marginal portion of the blank to form the reaction flange 17.

When the spring element is formed in this or some equivalent manner, the material constituting the reaction flange normally has a pronounced tendency to depart from its cylindrical shape and to flare radially-outwardly to a substantial extent so that instead of being a cylindrical flange it would be frusto-conical in shape and not as well suited to perform its functions which are hereinafter more fully described. It has been found that this tendency of the reaction flange to become deformed outwardly to a frusto-conical shape may be very substantially minimized or obviated by forming a series of notches in the outer periphery of the spring blank before forming it to its V-shape. These notches, which appear as preferably semi-circular notches 20 in the free edge of the reaction flange 17, have the effect of weakening the outer marginal portion of the spring blank to some extent so that the flange 17 has a much reduced tendency or, indeed, very little tendency to depart from its cylindrical shape after the spring member has been formed.

The described weakening of the reaction flange 17 by the notches 20 serves to render that flange more flexible for purposes hereinafter set forth. It appears, also, that the provision of such notches aids in permitting the material of the flange 17, during formation of the latter, to be altered from its flat form to its cylindrical form. Stated differently, the effect of dies which are employed to shape the spring member and, more particularly, of the die portions which shape the reaction flange 17, is to impose what might be termed an ironing effect upon the material of the latter flange. Under such conditions, if the metal being ironed out or pressed out is not provided with open areas such as the notches 20 into which it might flow to some extent, such flow is substantially inhibited in the formed flange and when the spring element is removed from the dies the inhibited flow apparently causes a reaction in the flange material which causes the flange 17 to depart to an objectionable extent from its desired cylindrical shape.

The notches 20 also apparently have another effect relating to distortion or creasing of the spring material which takes place when the outer marginal portion of the spring blank is converted by the die action from a flat or radially-extending attitude to its desired axial or cylindrical shape. The notches 20 preferably are spaced apart quite uniformly in a circumferential series and apparently this uniform spacing asserts a substantial control over the creasing that takes place in the flange material when the flange 17 is formed. Without such notches the flange material might tend to crease more or less spirally in some circumferential portions while the creases might be substantially co-axial in other circumferential portions of the flange. Also, without such notches, the flange material would tend to fold over upon itself at one or more circumferential points, thereby inducing the formation of axially extending cracks or tears which would render the flange 17 much too resilient to enable it to function satisfactorily as a pressure member for pressing the rubber of the mounting portion 12 into the recess 25 as hereinafter explained. However, when the notches 20 are formed in the spring blank, it is found that the creases 21 formed by the described die action are quite uniformly directed in a co-axial direction in all circumferential portions of the flange. With such uniformity of creasing of the flange 17 in its formation, it results that the said flange exhibits substantially uniform bodily flexing characteristics completely around its circumference, so that, when the spring element is incorporated as a part of an oil seal, the resultant oil seal likewise possesses similar uniform flexing characteristics.

An oil seal, as just described, is suitable for use to seal a shaft 22 which is shown in Fig. 4 as extending through an annular opening 23 in a machine casing 24. In the cylindrical wall of the latter, defining the opening 23, there preferably is formed an inner-annular recess 25 which, at its bottom, is preferably of an over-all diameter slightly less than the outer diameter of the oil seal when the latter is in its normal condition, as before it is installed for use. The recess 25 also is preferably of about the same width or possibly slightly less than the width of the oil seal.

In a structure as just described, an oil seal 10, according to this invention, may be sleeved onto the shaft 22 from the right end of the latter as it appears in the drawing. When the oil seal has been slid along the shaft to a point at which its further movement is obstructed by the machine casing 24, one circumferential portion of the seal, as for example, the upper part, may be squeezed into the upper part of the opening 23 and pushed inwardly into the casing with a suitable pushing tool while the lower part of the seal trails somewhat within the lower part of the opening 23. The upper portion of the seal is thus pushed until it comes into radial alignment with the recess 25 where it may react to the forces set up by the squeezing of that part of the seal to cause the latter to expand radially into the upper portion of the recess. Once this initial, partial setting of the oil seal takes place, adjacent circumferential portions of the seal may be pressed further inwardly along the shaft until the seal in its entirety has been pushed into radial alignment with the recess 25 and has expanded thereinto.

During the described forcing of the seal into place, the various parts thereof undergo varying degrees and types of distortion such as squeezing, bending, rolling and twisting which are permitted by the very flexible character of the seal as a whole. The great flexibility of the seal, permitting such substantial distortion thereof arises from the fact that the principal component of the device, which is the sealing member 11, is of relatively soft rubber or rubber-like material, and because the spring member 16 is also very flexible. Moreover, because of the V shape of the seal in radial section, the seal may be more or less collapsed radially to enable its radial thickness to be reduced to or slightly less than the radial dimension of the opening 23 so that it can be pushed into said opening.

It may be seen that, when the oil seal is in place in the recess 25, the rubber or rubber-like sealing member 11 is held firmly therein against any material deformation thereof in an axial direction and that there is no force present which might tend to deform the sealing member 11 radially from the circular shape in which it is molded. However, in seals wherein an outer peripheral seal portion of soft rubber-like material is relied upon to effect a seal with an adjacent cylindrical wall of a machine element in which it is mounted, it is desirable to provide means for pressing the soft peripheral portion radially into firm sealing engagement with said cylindrical wall. This highly desirable objective is accomplished in the present invention because, although the spring member 16 is very flexible when not in a seal installed in a machine, its reaction flange 17 is held in perfect circular condition by the mounting portion 12 when the seal is installed in a machine; and, when thus held, the reaction flange is substantially non-compressible circumferentially and, hence, functions to press the mounting portion 12 firmly into the recess 25.

The outer periphery of the sealing member 12 may advantageously be beveled toward one end thereof as at 26 to facilitate the described insertion of the oil seal in a machine. One way in which such a bevel may thus aid the oil seal's installation may be apparent from the bottom of Fig. 4, where it is shown as in engagement with an adjacent part of the machine casing wall when the lower portion of the oil seal is in a tilted attitude. Obviously, if this bevel were not provided it would be somewhat more difficult to force the oil seal into the opening 23. It will be understood, also, that the mentioned bevel aids the sealing member 11 in entering the recess 25.

It has been found, also, that sealing devices according to this invention may be pushed into place within a groove or recess such as recess 25 without the described twisting shown in Fig. 4. For example, when inserting the sealing device, a suitable, flat, annular pushing tool may be pressed against the flat right end of the device and push it leftwardly into the opening 23 and into the recess 25 while maintaining the device perpendicular to the line of such pushing movement. For this purpose it is preferable that the small diameter end of the bevel 26 be slightly smaller than the diameter of the opening 23 so that the bevel will aid in starting the device into said opening. This non-twisting pushing of the oil seal device into the opening 23 and the recess 25 may be done either before or after the shaft 22 has been inserted into the said opening.

Although it is difficult to determine the particular characteristics which permit such non-twisting pushing of the oil seal into place, nevertheless, it is believed that the cylindrical flange 17 of the spring member possesses sufficient circumferential resiliency or that only such narrow parts thereof are relatively non-resilient circumferentially that said flange yields or contracts radially as a reaction to the radial constriction of the body portion 12 of the soft rubber sealing member 11 when the latter is pushed into the somewhat smaller diameter of the opening 23. One possible explanation of this is that the creases 21, although minute, nevertheless function as a circumferential series of folds which permit slight temporary radial constriction of the flange 17, and that the series of notches 20 enhance the capacity of the said flange to become thus constricted. Another possible explanation is that the notches 20, with or without aid from the creases 21, render the free-edge side of the flange 17 circumferentially flexible, leaving only a narrow relatively non-constrictable portion of said flange immediately adjacent to the neck portion 19; this non-constrictable portion being so narrow that the rubber of the mounting portion 12 of the sealing member may flow radially inwardly at both sides of said non-constrictable portion while the device is being pushed along the opening 23 toward the recess 25.

In any event, it appears that the notches 20 enhance the resiliency of the flange 17 and prevent kinking of the device when being installed and when in use; these attributes being additional to the previously mentioned capacity of the said notches to aid in maintaining the said flange in its desired cylindrical form.

It will be seen, from the foregoing, that the present invention provides a unitary oil seal which is bodily or partly flexible and which because of that flexibility may be pushed into place within an annular recess in a machine casing. Obviously, the same oil seal would be useful if the machine casing, instead of being formed with an annular recess 25, were simply formed with a bore having a shoulder defining the bottom of the bore. In such an arrangement, the oil seal according to this invention would merely be pressed into the bore and seated firmly against the bottom shoulder thereof, and the fact that the sealing member is of greater over-all diameter than the bore would constitute one factor causing the seal to be held firmly in place in the bore. This firm disposition of the oil seal would be enhanced by the reaction flange 17 which, in the manner already described, would press the mounting portion 12 radially into firm sealing engagement with the adjacent cylindrical wall of the bore in the machine casing.

When the seal is in operative position in a machine, a reaction is present between the spring fingers 18 and the reaction flange 17, in which the latter functions as a base or anchor member enabling the resiliency of the spring fingers to be operative radially inwardly to press the sealing lip 15 firmly against the shaft.

The present inventive concept obviously may be utilized in various other structures without departing from the invention as set forth in the following claims.

What we claim is:

1. A sealing device for sealing an annular space between an inner machine element and an opening in an outer machine element through which the inner element extends, comprising a sealing ring having a radially compressible, cylindrical mounting portion adapted to sealingly engage a surface of said outer element defining said opening and a flexible, annular sealing flange extending radially inwardly and axially from the said mounting portion and having a sealing surface adapted to effect a sliding sealing engagement with the inner machine element, and an annular spring, of flat spring material, having an approximately cylindrical pressure-reaction flange intimately underlying and in contact with said mounting portion throughout a substantial intermediate width part thereof and a series of integral spring fingers extending only from one side of said cylindrical flange and around and in contact with the exterior of the sealing flange and adapted to urge said sealing flange inwardly into firm sliding sealing engagement with the inner machine element; the said cylindrical flange having plural similar notches in and confined to the margin thereof at the other side of said flange and a cylindrical portion of substantial width extending axially from said one side of the cylindrical flange to the said notches, which cylindrical portion is circumferentially continuous in being entirely clear of said notches and of spaces between said fingers; the said notches being effective to prevent buckling of the said margin of said cylindrical flange when the latter is subjected to radially inwardly directed pressure.

2. A sealing device according to claim 1, the said mounting portion of the sealing ring extending substantially beyond the notched edge of said pressure-reaction flange so that the thus extending part of the mounting portion is free to flex inwardly, substantially uninhibited by the pressure-reaction flange.

LEO F. JONES.
GEORGE F. CLOSS.

REFERENCES CITED

The following references are of record in the file of this patent:

UNITED STATES PATENTS

| Number | Name | Date |
| --- | --- | --- |
| 827,668 | Reed | July 31, 1906 |
| 868,225 | Schonert et al. | Oct. 15, 1907 |
| 1,958,120 | Tuxbury et al. | May 8, 1934 |
| 1,988,341 | Sjolander | Jan. 15, 1935 |
| 2,088,703 | Hubbard et al. | Aug. 3, 1937 |
| 2,417,390 | Winkeljohn | Mar. 11, 1947 |
| 2,434,484 | Chambers | Jan. 13, 1948 |
| 2,530,034 | Sjolander | Nov. 14, 1950 |